United States Patent
Peumans et al.

(10) Patent No.: US 11,262,239 B2
(45) Date of Patent: Mar. 1, 2022

(54) MULTICOLOR SENSOR FOR FLOW CYTOMETRY

(71) Applicant: IMEC VZW, Lueven (BE)

(72) Inventors: Peter Peumans, Leuven (BE); Pol Van Dorpe, Leuven (BE); Niels Verellen, Leuven (BE)

(73) Assignee: IMEC VZW, Leuven (BE)

( * ) Notice: Subject to any disclaimer, the term of this patent is extended or adjusted under 35 U.S.C. 154(b) by 47 days.

(21) Appl. No.: 16/715,351

(22) Filed: Dec. 16, 2019

(65) Prior Publication Data
US 2020/0200604 A1 Jun. 25, 2020

(51) Int. Cl.
 G01J 3/28 (2006.01)
 G01J 3/02 (2006.01)
 G01J 3/26 (2006.01)
 G01J 3/36 (2006.01)
 G01N 15/14 (2006.01)

(52) U.S. Cl.
 CPC .............. *G01J 3/2803* (2013.01); *G01J 3/02* (2013.01); *G01J 3/26* (2013.01); *G01J 3/36* (2013.01); *G01N 15/1425* (2013.01); *G01J 2003/2806* (2013.01)

(58) Field of Classification Search
 CPC ....... G01J 2003/1213; G01J 2003/2806; G01J 3/02; G01J 3/26; G01J 3/2803; G01J 3/36; G01J 3/44; G01N 15/1425; G01N 15/1434; G01N 15/1436; G01N 15/1459
 USPC ......................................................... 356/326
 See application file for complete search history.

(56) References Cited

U.S. PATENT DOCUMENTS

| 10,072,970 B1 | 9/2018 | Twede et al. |
| 2006/0001882 A1* | 1/2006 | Te Kolste ................ G01J 3/26 356/419 |
| 2012/0156714 A1* | 6/2012 | O'Brien ................ G02B 5/288 435/29 |

(Continued)

FOREIGN PATENT DOCUMENTS

EP 2293032 A1 3/2011

*Primary Examiner* — Sunghee Y Gray
(74) *Attorney, Agent, or Firm* — Moser Taboada

(57) ABSTRACT

The present disclosure relates to a spectral sensor for detection of individual light-emitting particles. The sensor is comprising an array of photo-sensitive detectors for detecting light emitted by said individual light-emitting particles and a filter array comprising a plurality of different band-stop filters. The filter array is configured to transmit wavelengths in a detectable wavelength region to the array of photo-sensitive detectors, and wherein each band-stop filter is associated with one or more particular photo-sensitive detectors, and the plurality of different band-stop filters are configured to reflect different wavelength intervals within said detectable wavelength region so that each photo-sensitive detector of the array is configured to detect the wavelengths of the detectable wavelength region other than the reflected wavelength interval of the band-stop filter being associated with the photo-sensitive detector. The sensor is further comprising a processing unit in communication with said array of photo-sensitive detectors and configured for determining a spectral characteristic of an individual light-emitting particle based on the response from said array of photo-sensitive detectors.

14 Claims, 4 Drawing Sheets

(56) References Cited

U.S. PATENT DOCUMENTS

| | | | |
|---|---|---|---|
| 2013/0083315 A1* | 4/2013 | Lo | G01N 15/1459 |
| | | | 356/73 |
| 2015/0268244 A1* | 9/2015 | Cho | G01N 15/1463 |
| | | | 435/7.23 |
| 2016/0169808 A1 | 6/2016 | Jiang | |
| 2016/0169809 A1 | 6/2016 | Jiang | |
| 2016/0320306 A1* | 11/2016 | Huffman | G02B 21/16 |
| 2017/0254738 A1 | 9/2017 | Vacca | |

* cited by examiner

MULTICOLOR SENSOR FOR FLOW CYTOMETRY

CROSS-REFERENCE TO RELATED APPLICATION

The present application is based on priority claimed on European Patent Application No. 18214403.0, filed on Dec. 20, 2018, the contents of which are incorporated herein by reference.

TECHNICAL FIELD

The present inventive concept relates to a spectral sensor for flow cytometry. In particular, the present inventive concept relates to a spectral sensor for detection of individual light-emitting particles.

BACKGROUND

In many applications, it is desired to acquire spectral information of an object. Hyperspectral sensors may for instance be used in analysis of imaged objects, such as for determination whether a substance having a specific spectral profile is present in the object. With advances to semiconductor fabrication, it possible to produce sensors based on complementary metal-oxide-semiconductor (CMOS) technology, wherein a substrate comprising an array of photo-sensitive areas is integrated with filters for selectively transmitting light to the photo-sensitive areas.

Flow cytometry is a technique for detecting and measuring characteristics of a population of cells or particles. A fluid suspension of the cells or particles, often fluorescently labelled, is led through a focused laser beam and the scattered light, which is characteristic to the type of cell or particle, is detected. Flow cytometry facilitates a high throughput and samples comprising thousands of cells or particles may be examined during short periods of time.

Although flow cytometry facilitates multiparametric analyses of single biological particles at a high flow rate, a complex set of optical filters may be required in order to perform multispectral flow cytometry, in which separated spectral bands of the individual particles are obtained.

A frequently used detector used in multispectral flow cytometry is an "octagon multispectral sensor". In such a sensor, multiple long-pass/band-pass filter and detector combinations are arranged in a particular geometrical scheme as to be able to detect several (in casu 8) fluorescence bands.

Document U.S. Pat. No. 10,072,970 relates to a multi-spectral image sensor comprising CCD or CMOS image sensors used for creating a multispectral image of an object. There is thus a need in the art for a less complex sensor that enables hyperspectral flow cytometry from samples emitting light of low intensity.

SUMMARY

It is an object of the invention to at least partly overcome one or more limitations of the prior art. In particular, it is an object to provide a spectral sensor for detection of individual light-emitting particles and a flow cytometer comprising such a sensor.

As a first aspect of the invention, there is provided a spectral sensor for detection of individual light-emitting particles, said sensor comprising an array of photo-sensitive detectors for detecting light emitted by said individual light-emitting particles;

a filter array comprising a plurality of different band-stop filters;

wherein the filter array is configured to transmit wavelengths in a detectable wavelength region to the array of photo-sensitive detectors, and wherein each band-stop filter is associated with one or more particular photo-sensitive detectors, and wherein the plurality of different band-stop filters are configured to reflect different wavelength intervals within said detectable wavelength region so that each photo-sensitive detector of the array is configured to detect the wavelengths of the detectable wavelength region other than the reflected wavelength interval of the band-stop filter being associated with the photo-sensitive detector;

a processing unit in communication with said array of photo-sensitive detectors and configured for determining a spectral characteristic of an individual light-emitting particle based on the response from said array of photo-sensitive detectors The spectral sensor may be for multi- or hyperspectral detection of individual particles. The spectral information may be for wavelengths within and/or beyond the visible light spectrum.

The spectral sensor may thus be solely for detecting labelled particles. Thus, in embodiments, the spectral sensor is not an image sensor.

A light-emitting particle may be an organic or inorganic particle or a cell, such as a mammalian cell. The particle may be fluorescent in itself or it may comprise one or more dyes for emitting different wavelength spectra. As an example, the light-emitting particle may be a cell labelled with at least two fluorophores.

A photo-sensitive detector is a sensor element for detecting photons, e.g. a photodetector. The photo-sensitive detector may be arranged to convert light photons into current. The array of photo-sensitive detectors may be in two dimensions or only in one row.

A band-stop filter, or a band-rejection filter, is a filter that transmits most wavelengths of the detectable wavelength region, but reflects those in a specific wavelength interval of the filter. Thus, the band-stop filter may be the opposite of a band-pass filter. The band stop filter may be a notch filter that has a stop-band with a spectral bandwidth of 20-100 nm, such as about 50 nm.

The detectable wavelength region of the sensor may span at least 500 nm, such as the visible region, such as between 400 and 900 nm. The detectable wavelength band may also comprise ultraviolet wavelengths, such as wavelengths between 10 nm and 400 nm, as well as infrared wavelengths, such as wavelengths between 700 nm and 1 mm.

The band-stop filters may be interference filters, such as multilayer interference filters.

The array of band-stop filters are arranged such that light detected by the detector has passed at least one band-stop filter. Thus, the array of band-stop filters is arranged in the optical path to the detector. Since the filter array comprises different types of band-stop filters, i.e. filters reflecting wavelengths of different wavelength intervals within the detectable wavelength region, the array of photo-sensitive detectors forms an array of sensor elements for detecting different wavelength ranges other than the reflected wavelength interval of the band-stop filter being associated with the photo-sensitive detector.

The processing unit may be arranged for detecting the presence of labels in the particles or cells of a sample. The processing unit may therefore not be configured for creating or generating an image of a detected particle or cell.

In embodiments of the first aspect, the processing unit is configured for detecting the presence of at least one label in an individual light-emitting particle based on the determined spectral characteristic. As an example, the processing unit may be configured for detecting the presence of at least one label in an individual light-emitting particle based on a numerical optimization technique, such as a least square optimization technique or a matrix regularization technique.

The processing unit may be a computing device or comprise computer readable media with computer readable instructions. Thus, the processing unit may comprise a processor and a system memory. The processor may thus comprise instructions for determining or calculating a spectral characteristic of an individual light-emitting particle based on the response from said array of photo-sensitive detectors.

A spectral characteristic of an individual light-emitting particle may be the intensity value for one or several specific wavelengths, the emission spectra in a wavelength range, a likely fluorophore or dye combination within the light-emitting particle. The spectral characteristic may form a spectral "fingerprint" of an individual particle.

The first aspect of the invention is based on the insight that a detector array with band-stop filters will be able to detect a larger number of photons from a light-emitting particle as compared to a detector array associated with band-pass filters. Therefore, the detector of the present invention will be suitable for applications that require fast response, such as in flow cytometry applications when the light-emitting particles are detected at high flow rate. A sensor according to the first aspect is less complex than a prior art sensor with an octagon setup. Further, compared to a sensor having bandpass hyperspectral filters, the sensor of the present disclosure is more sensitive, and is thus suitable in applications that have high demands on sensitivity. In a hyperspectral sensor having a classical setup with an array of N bandpass filters, each photon has a chance of 1/N of landing on the right detector, whereas in the setup of the present disclosure, in which an array of band-stop filters is used, each photon has a (N−1)/N chance of being detected. The detected photon counts from the individual detectors may then be computed into spectra using e.g. least squares optimization.

Consequently, the sensor of the first aspect of the invention provides for a high overall photon detection probability. The sensor further facilitates a more compact assembly, such as having single detector elements and no discrete filters, and a simpler optical system, which in turn simplifies alignment and makes the system more robust. Furthermore, the sensor may allow for a smaller detector area since light may be focused fore tightly, which thus give a lower overall dark current.

The filter array may comprise at least two, such as at least three different types of band-stop filters. Band-stop filters of different types reflect different wavelength intervals of the detectable wavelength region. As an example, the filter array may comprise at least five different types of band-stop filters.

In embodiments of the first aspect, each band-stop filter of the filter array is configured to reflect a wavelength interval in said detectable wavelength region and transmit all other wavelengths in said wavelength interval, wherein at least two band-stop filters of the filter array are configured to reflect wavelength intervals that do not overlap.

Moreover, the filter array may comprise more than one band-stop filter of the same type. As an example, the filter array may comprise at least three, such as at least five types of band-stop filters and at least two band-stop filters of each type.

In embodiments of the first aspect, the different reflected wavelength intervals of the plurality of band-stop filters overlap with less than 50 nm. As an example, the different reflected wavelength bands may not overlap at all or may overlap with less than 20 nm, such as less than 10 nm.

The length of a wavelength interval that is reflected by a band-stop filter may be 50-100 nm, such as about 100 nm.

The filter array may comprise band-stop filters with reflected wavelength intervals that together cover an interval that is at least 50%, such as at least 75%, such as at least 90%, of the detectable wavelength region of the sensor.

Thus, if the detectable region of the sensor is about 500 nm, the filter array may comprise band-stop filters that together cover at least 300 nm. The different wavelength intervals that are reflected by the filter array may be distributed along the detectable wavelength region, such as distributed around the central wavelength of the wavelength region, with an overlap that is less than 50 nm.

In embodiments of the first aspect, at least one of the photo-sensitive detectors is selected from an avalanche photodiode (APD) and a silicon photomultiplier.

Avalanche photodiodes (APD) and a silicon photomultipliers are detectors that facilitates analyses of samples of low intensities at high rates.

An APD a semiconductor-based photodetector with an internal gain mechanism that creates a large number of electrons from incident photons. An APD provides higher sensitivity than a standard photodiode.

A silicon photomultiplier may be a single-photon-sensitive device and may be based on Single-photon avalanche diode (SPAD) implemented on common silicon substrate.

As an example, all of the photo-sensitive detectors may be selected from avalanche photodiodes (APDs) and silicon photomultipliers.

In embodiments of the first aspect, the detector is further comprising at least one additional filter for reflecting light outside said detectable wavelength region arranged in the optical path to said array of photo-sensitive detectors.

Such an additional filter may for example be a low-pass, a high-pass or a band-pass filter. The additional filter or filters may be for reflecting e.g. excitation light that has been used for exciting fluorophores in the light-emitting particles that are detected.

Other filters in the optical path may be arranged to set the boundaries for the detectable wavelength region.

In embodiments of the first aspect, the filter array is integrated on top of the array of photo-sensitive detectors.

Integrated filter arrays may be produced using CMOS fabrication technology, which allows production of very small size layer structures. Thus, it is possible with CMOS fabrication technology to create filters integrated with a substrate comprising photo-sensitive detectors Thus, the filter array may be monolithically integrated on the array of photo-sensitive detectors. This implies that the filter array is fixedly associated with the photo-sensitive detectors and that a relation between the filter array and the photo-sensitive detectors will not be altered after the sensor has been manufactured. Consequently, the filter array may be produced on the array of photo-sensitive detectors using CMOS manufacturing processes, such as selective depositing and etching of layers in order to form different interference filters and filter stacks of a band-stop filter. This may be beneficially used with a CMOS substrate providing the array of photo-sensitive detectors.

In embodiments of the first aspect of the invention, the processing unit is configured for determining a spectral characteristic as a probable combination of different light-emitting dyes in said particle.

Other measurable spectral characteristics include light absorption and light scattering, which may be used in the measurement of cell size, shape, density, granularity, and stain uptake.

The processing unit may be configured for receiving input data from the array of photo-sensitive detectors. The processing unit may further be configured to execute computer code instructions which for instance may be stored on a memory. The memory may thus form a (non-transitory) computer-readable medium for storing such computer code instructions. The processing unit may alternatively be in the form of a hardware component, such as an application specific integrated circuit, a field-programmable gate array or the like.

The processing unit may be configured for determining the spectral characteristic based on a numerical optimization technique, such as least square optimization or a matrix regularization technique.

In embodiments of the first aspect, the processing unit is configured to compare the determined spectral characteristic of a light-emitting particle with references of known types of light-emitting particles, thereby determining the type of light-emitting particle.

Thus, the processing unit may use the determined spectral characteristic and compare it with reference samples, in order to more quickly determine the type of light-emitting particle detected. The processing unit may thus use the determined spectral characteristic as a footprint and compare it with previously detected reference samples. The spectral characteristics of the reference samples may be stored in a memory of the processing unit or on a memory or database to which the processing unit has access.

As a second aspect of the invention, there is provided a method for detecting light-emitting particles in a flowing sample comprising the steps of:
a) detecting emitted light from individual light-emitting particles in a flowing sample with a spectral sensor according to the first aspect above; and
b) determining a spectral characteristic of individual light-emitting particles by said processing unit.

Effects and features of this second aspect are largely analogous to those described above in connection with the first aspect. Embodiments mentioned in relation to the first aspect are largely compatible with the second aspect.

The method of the second aspect is advantageous in that it allows for fast determination of the light emitting particle in a flowing sample. Thus, the method of the second aspect allows for determination at high flow rates and a high throughput of light emitting particles.

In embodiments of the second aspect, the determination of step b) comprises determining the spectral characteristic as a probable combination of different light-emitting dyes in the individual light emitting particles.

Other measurable spectral characteristics include light absorption and light scattering, which may be used in the measurement of cell size, shape, density, granularity, and stain uptake.

Further, in embodiments of the second aspect, the method is comprising a step c) of identifying the type of light-emitting particle based on the determination of step b).

The step of identifying may further comprise a step of displaying the identified particle on a screen or.

The step of identifying may further comprise counting the number of identified light-emitting particles of at least one type, such as counting the number of identified light-emitting particles of all types, and storing the numbers on a memory.

In embodiments of the second aspect, the identification of step c) comprises comparing the determined spectral characteristic of step b) with references of known types of light-emitting particles, thereby identifying the type of light-emitting particle.

In embodiments of the second aspect, the light-emitting particles are cells labelled with at least one light-emitting dye.

The cells may for example be mammalian cells or prokaryotic cells.

The method of the second aspect may thus be a flow cytometry method.

The cells may be fluorescently labelled. Fluorescence provides a quantitative measure of various biochemical and biophysical properties of the cell, as well as a basis for cell sorting dependent on the determined type of cell.

As a third aspect of the invention, there is provided a flow cytometer for analysing single light-emitting particles of a sample; said flow cytometer comprising
  an excitation light source for exciting said light-emitting particles;
  a flow cell for receiving and flowing said sample to be analysed through the excitation light of said excitation light source; and
  a spectral sensor according to the first aspect of the invention for detecting the light emitted by single light-emitting particles of said sample upon excitation of said excitation light source.

The flow cytometer may thus be arranged for making measurements on individual cells in a cell suspension and for displaying the measurements. The flow cytometer may be arranged for analysing samples comprising more than thousand, such as more than ten thousand, light emitting particles.

Flow cytometry concept requires fast detectors to detect fluorescence events. Due to the presence of the spectral sensor of the present disclosure in the flow cytometer, a sample may be analysed at a higher flow rate.

The excitation light source may be a laser source or a mercury arc lamp.

Moreover, the excitation light source and the flow cell may be arranged so as to allow the excitation light to be focused within the cell.

The flow cytometer may further comprise a system for applying a flow, such as a laminar flow, to the sample such that a stream of cells in a single line is flowed pass the focused excitation light source.

The spectral sensor may be arranged at the flow cell, such as adjacent to the flow cell, or be positioned a distance from the flow cell. Consequently, in embodiments of the third aspect, the flow cytometer is further comprising at least one waveguide for transmitting the light emitted by said light-emitting particle to said spectral sensor.

The at least one waveguide may comprise an optical fiber.

In embodiments of the third aspect, the flow cytometer further comprises a sorting device for sorting said light emitting particles based on information from the spectral sensor, such as from the processing unit of the spectral sensor.

The information may thus be information about a spectral characteristic of an individual particle or an identification of an individual particle, both detected or identified by the spectral sensor. This information may thus be used to sort the individual particles into different sections outputs or containers. Consequently, the flow cytometer may comprise particle sorting capabilities based on the particle detection.

The sorting device may be any type of cell sorting device as known in the art. Consequently, once a light emitting particle, such as a cell, has been detected by the spectral sensor, the processing unit may send a trigger signal, such as operational requests, to the sorting device. The flow cytometer may thus be configured to sort the light emitting particle based on the identification by the spectral sensor. The sorting device may thus be configured to receive operational requests directly from the spectral sensor. In other words, the spectral sensor, when detecting particles, may actuate the sorting mechanism of the sorting device.

However, as a complement or an alternative, the flow cytometer may comprise a control unit configured for receiving said information from the processing unit and further configured for sending operational requests to the sorting device. The operational requests may thus comprise information on how to sort the particle based on the detection of the spectral sensor. Thus, the sorting device may be configured to receive information indirectly from the spectral sensor via a control unit, such as a processing unit, of the flow cytometer.

The control unit may comprise a processor and a system memory. The processor may thus comprise instructions for determining how to sort an individual light-emitting particle based on input from the processing unit of the spectral sensor and further configured for sending operational requests to the sorting device.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Detailed embodiments of the present invention will now be described with reference to the drawings.

Figure 1:
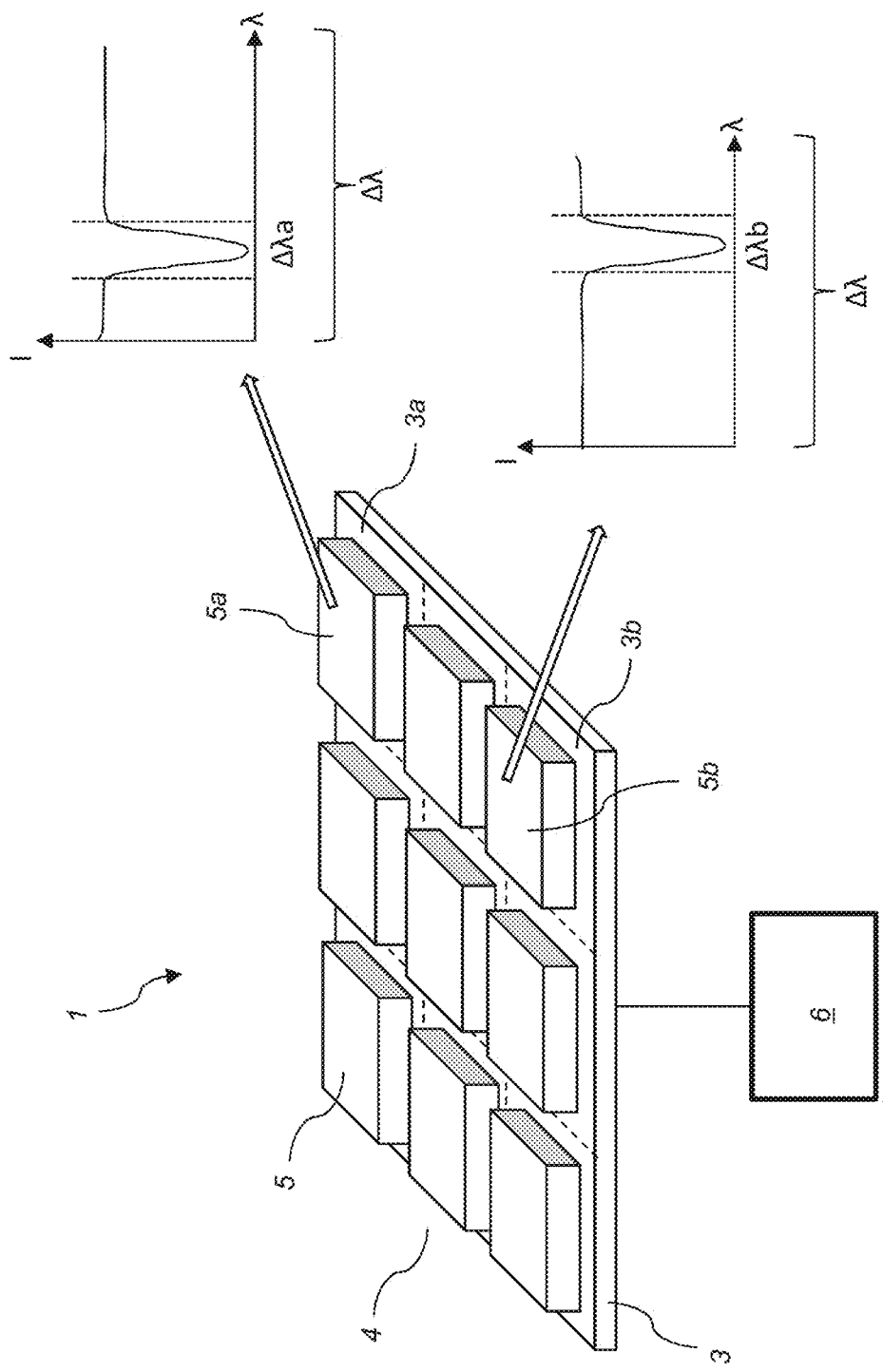
FIG. 1 is a schematic illustration of a spectral sensor of the present disclosure.

FIG. 1 show a schematic illustration of a spectral sensor 1 according to an embodiment of the present disclosure. The sensor 1 is for detection of individual light-emitting particles and is a single-element multi-colour detector for use in cytometry and other fields where fluorescence events need to be distinguished in terms of colour and brightness.

The sensor 1 comprises an array of photo-sensitive detectors 3 for detecting light emitted by the individual light-emitting particles 2. In this embodiment, all individual detectors are Avalanche Photo Diodes (APDs).

The sensor 1 further comprises a filter array 4 comprising a plurality of different band-stop filters 5. The filter array is arranged in the optical path to the detectors and is configured to transmit wavelengths in a detectable wavelength region to the array of photo-sensitive detectors 3. The detectable wavelength region is denoted $\Delta\lambda$ in FIG. 1. Each band-stop filter 5 is associated with one or more particular photo-sensitive detectors 3. In the embodiment shown in FIG. 1, each of the detectors in the array 3 are associated with a single band-stop filter 5, i.e. there is one band-stop filter 5 over each detector of the array 3.

The plurality of different band-stop filters 5 are further configured to reflect different wavelength intervals within said detectable wavelength region so that each photo-sensitive detector 3 of the array is configured to detect the wavelengths of the detectable wavelength region other than the reflected wavelength interval of the band-stop filter 5 being associated with the photo-sensitive detector 3.

This is illustrated by the illustrative filter transmission spectra shown in FIG. 1. The photodetector 3a is associated with band stop filter 5a, which is configured to reflect wavelengths in wavelength interval $\Delta\lambda a$, which is within the detectable wavelength region $\Delta\lambda$ but substantially smaller. Further, photodetector 3b is associated with band stop filter 5b, which is configured to reflect wavelengths in wavelength interval $\Delta\lambda b$, which is within the detectable wavelength region $\Delta\lambda$ but substantially smaller. Wavelength intervals $\Delta\lambda a$ and $\Delta\lambda b$ are selected so that they do not overlap.

For example, the detectable wavelength region $\Delta\lambda$ may be about between 400 and 900 nm, and $\Delta\lambda a$ and $\Delta\lambda b$ may be less than 100 nm in length.

Each of the nine detectors of the array shown in FIG. 1 may be associated with different types of band-stop filters 5 configured to reflect wavelengths in different wavelength intervals $\Delta\lambda i$. The different wavelength intervals $\Delta\lambda i$ may be selected so that they together cover the detectable wavelength region $\Delta\lambda$. The different wavelength intervals $\Delta\lambda i$ may further be selected so that they do not overlap, or overlap with less than 30 nm, such as less than 20 nm, with another wavelength interval at each end point of the wavelength interval.

The spectral sensor 1 further comprises a processing unit 6 in communication with said array of photo-sensitive detectors 3. Such a processing unit is configured for determining a spectral characteristic of an individual light-emitting particle 2 based on the response from said array of photo-sensitive detectors 3. The spectral characteristic that is measured may for example be the most likely fluorophore combination for each particle, which may be used for classifying a particle such as a cell.

Determining the most likely fluorophore combination may be performed as follows:

The spectrum S from each detected particle or cell may be written as a linear combination of the fluorophore spectra $$S = a_1 S_1 + a_2 S_{21} + \ldots + a_n S_n$$

The response R in the N detector elements can be calculated using the forward filter-fluorophore matrix C $$R = \begin{bmatrix} R_1 \\ \vdots \\ R_M \end{bmatrix} = \begin{bmatrix} C_{11} & \cdots & C_{1M} \\ \vdots & \ddots & \vdots \\ C_{N1} & \cdots & C_{NM} \end{bmatrix} \begin{bmatrix} a_1 \\ \vdots \\ a_N \end{bmatrix}$$

For a measured response R, the most likely fluorophore combination is estimated as follows $$\begin{bmatrix} \widetilde{a_1} \\ \vdots \\ \widetilde{a_N} \end{bmatrix} = C^{-1} \begin{bmatrix} R_1 \\ \vdots \\ R_M \end{bmatrix}$$

This may be solved by using a least squares optimization with nonnegativity constraints $a=\text{lsqnonneg}(C,R)$ In the embodiments shown in FIG. 1, there are nine detectors, i.e. N=9.

Figure 2:
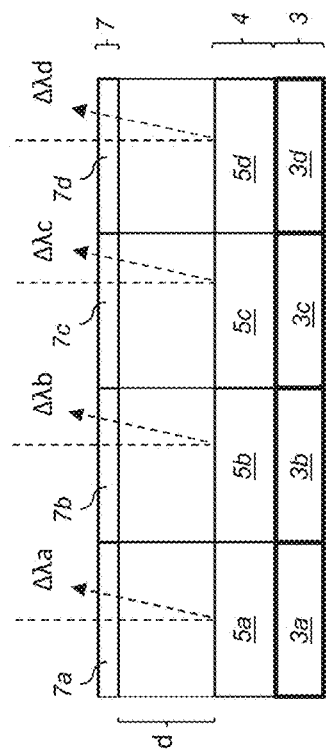
FIG. 2 is a side view of a spectral sensor according to the present disclosure.
Figure 2:
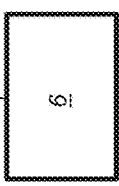
Figure 4:
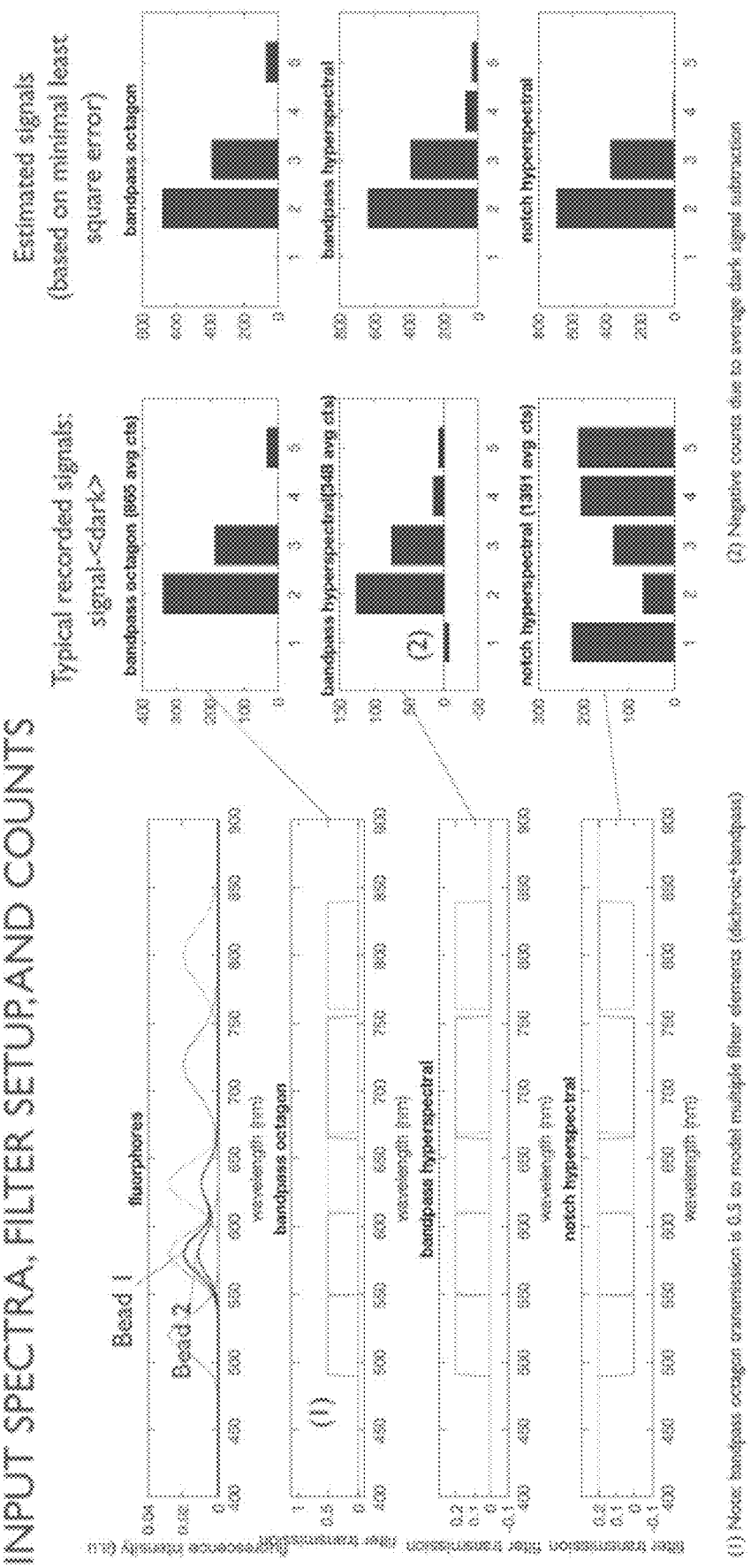
FIG. 4 provides a simulated comparison between models for the octagon, a multispectral band-pass filter/detector array and a multispectral notch filter/detector array of the present disclosure.

FIG. 2 shows a further embodiment of a spectral sensor 1 of the present disclosure. FIG. 2 is a schematic sectional view of a sensor 1 comprising an array 3 of photo-sensitive detectors 3, with individual photo-sensitive detectors 3a-d, onto which a filter array 4 comprising a plurality of different band-stop filters 5a-d are arranged. As in the embodiment discussed in relation to FIG. 1 above, each detector 3a-d is associated with a single band-stop filter 5a-d. The band-stop filters are selected so that they reflect different wavelength intervals within the detectable wavelength region. As shown in FIG. 4, band-stop filter 5a reflects wavelength interval Δλa, band-stop filter 5b reflects wavelength interval Δλb, band-stop filter 5c reflects wavelength interval Δλc, and band-stop filter 5d reflects wavelength interval Δλd. The reflected wavelength intervals Δλa-Δλd may cover unique wavelengths, or they may overlap with less than with less than 50 nm, such as less than 20 nm.

The photo-sensitive detectors 3a-d form a continuous area in a substrate sensitive to incoming light and the different types of band-stop filters 5a-d are arranged side-by-side on the single continuous area. In this case, the array 4 of band-stop filters are monolithically integrated on top of the photo-sensitive detectors 3a-d. Further, there are additional filters 7a-d built on cover glass and arranged a distance d from the array 4 of band-stop filters, as seen in the optical path of the light reaching the photo-sensitive detectors 3a-d. The additional filters 7a-d may be multiband filters and may be the same or different. The additional filters 7 may be selected to filter out light outside the detectable wavelength region of the photo-sensitive detectors 3a-d. AS an example, the additional filters 7 may be selected to filter out excitation light used for exciting the particles or cells that are analysed in a sample. The combined effect of the monolithically integrated band-stop filters 5a-d and the additional filter 7 produces a cleaner and more specific transmission spectrum reaching photo-sensitive detectors 3a-d. The use of the additional filters 7 arranged a distance from the filter array 4 relaxes the constrains in the construction of the monolithically integrated filters. Thus, the additional filters 7 may be manufactured in a separate stage and it creates the opportunity to do a single production run photo-sensitive detectors 3a-d and band-stop filters and then further vary the filter specifications by selecting the correct additional filter 7.

As in the embodiments discussed in relation to FIG. 1 above, the sensor further comprises a processing unit 6 in communication with said array of photo-sensitive detectors 3 and configured for determining a spectral characteristic of an individual light-emitting particle 2 based on the response from said array of photo-sensitive detectors 3.

The spectral sensor 1 as disclosed in FIGS. 1 and 2 is a robust, compact multicolour detector that combines a high quantum efficiency and low detector area. The spectral sensor 1 can be built in a monolithic fashion.

Figure 3:
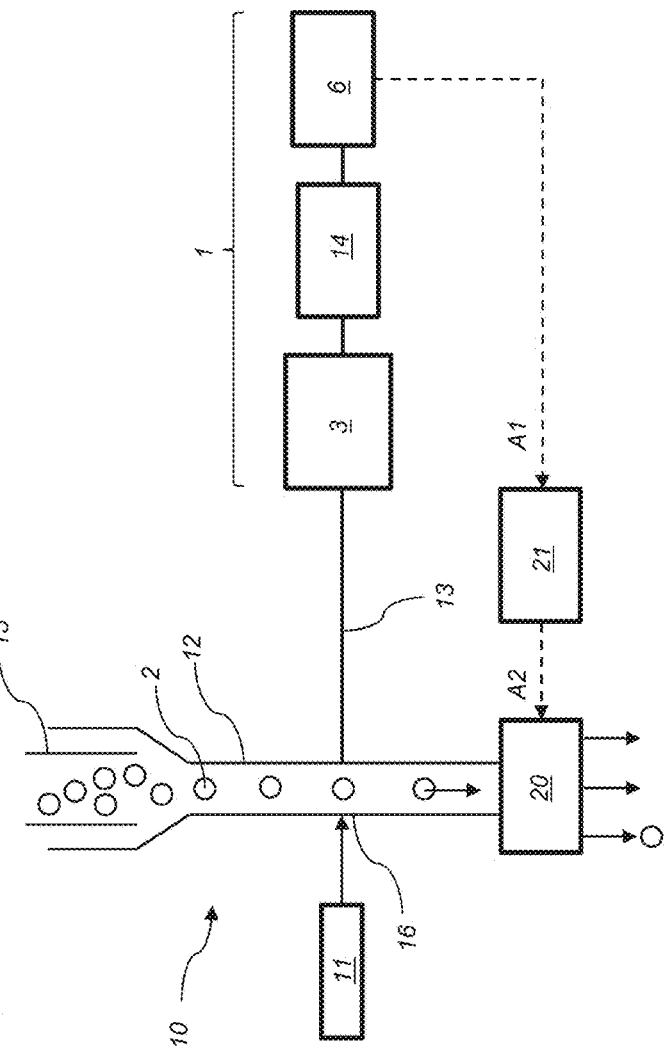
FIG. 3 is a schematic illustration of a flow cytometer of the present disclosure.

FIG. 3 shows a schematic illustration of a flow cytometer 10 of the present disclosure. The flow cytometer 10 is for analysing single light emitting particles, such as cells, and may for example be used for apoptosis analysis, cytotoxicology, cell signalling studies and analyses of ion flux and cellular pH.

The flow cytometer 10 comprises a flow cell having a conduit 12 into which the sample to be analysed is supplied. This may be achieved by the use of a sample providing unit 15, which connects with the flow cell conduit 12 and is arranged to draw a sample from a sample tube. The sample may thus be a sample comprising fluorescently labelled cells 2.

The flow cytometer 10 further comprises an exciting light source 11, which in this embodiment is a laser. The laser 11 is arranged so that the exciting light is focused into a portion of the flow cell 10. The flow cell 10 is thus positioned to receive the focused laser beams at region 16 of where fluoresced cells 2 scatter the laser beams into fluorescent light, i.e. the flow cell is arranged for receiving and flowing said sample to be analysed through the excitation light of the laser 11. The flow cell 10 may be part of a fluidic system arranged for flowing the supplied sample in a laminar flow past the region 16 where the laser is focused. The fluidic system may thus be arranged for applying a flow, such as a laminar flow, to the sample such that a stream of cells in a single line is flowed pass the focused excitation light source at the region 16 of the flow cell 10.

The flow cytometer 10 further comprises an optical fiber 13 positioned to collect the fluorescent light from the cells at the region 16 where the laser is focused.

The collected light is guided to a spectral sensor for detecting the light emitted by single light-emitting particles as disclosed in relation to FIGS. 1 and 2 above.

The output signals from the detectors 3 are led via an amplifier 14 to the processing unit 6, where each cell is characterized based on the determined spectral characteristic.

The sample may comprise more than 10 000 cells and the spectral characteristic of these cells may be determined and also tabulated. Based on the determination by the processing unit 6, the cells may, after passing the excitation region 16 of the flow cell 10, be sorted into different collection vials by means of electrostatic charging and subsequent charge mediated deflection, as known in the art.

Results from the determination of the processing unit may further be displayed in the form of distribution histograms when performing single parameter studies or as two-dimensional plots when performing multiple parameter studies.

As illustrated in FIG. 3, the flow cytometer 10 further comprises a sorting device 20 arranged downstream of the excitation region 16. This sorting device 20 is configured to sort the individual light emitting particles or cells 2 based on information from the processing unit 6 of the spectral sensor 1. The sorting device may be any type of cell sorting device as known in the art.

In the embodiment illustrated in FIG. 3, the flow cytometer 10 comprises a control unit 21 configured for receiving information from the processing unit 6, as illustrated by arrow A1. The information may thus comprise data about the individual cell particle, such as identification data or information about the individual particle 2. This control unit 21 is further configured to send operational requests to trigger or actuate the sorting device 20, as illustrated by arrow A2, based on the received information from the processing unit 6.

However, the connection between the processing unit 6 and the sorting device 20 may also be a direct connection, i.e. the spectral sensor 1 may itself actuate the sorting device 20 without sending information to a control unit 21. Thus, in embodiments, the flow cytometer is free of the control unit 21, and there is a direct contention between sensor 1 and the sorting device 21.

FIG. 4 provides a simulated comparison between models for a prior art octagon detector, a multispectral band-pass filter/detector array and a multispectral notch filter/detector array of the present disclosure. It shows the spectral response of 5 fluorophores and the response of two beads that contain a limited set of those fluorophores. In addition, on the left the spectral response of a single detector from the three model systems is plotted to a broadband illumination. On the right, the simulated signals of the individual detectors are shown, assuming emission from the beads, and the estimated starting signals. It is clear that the bandpass octagon gives the largest signal per detector, as this has been designed to direct all photons to a dedicated detector. The multispectral bandpass filter has a similar shape, but shows less photon counts due to the distribution of the photons over the different filters. In contrast, the multispectral notch filter set shows an inverted response, but with larger photon counts. In all cases, the starting signal was reconstructed.

Figure 5:
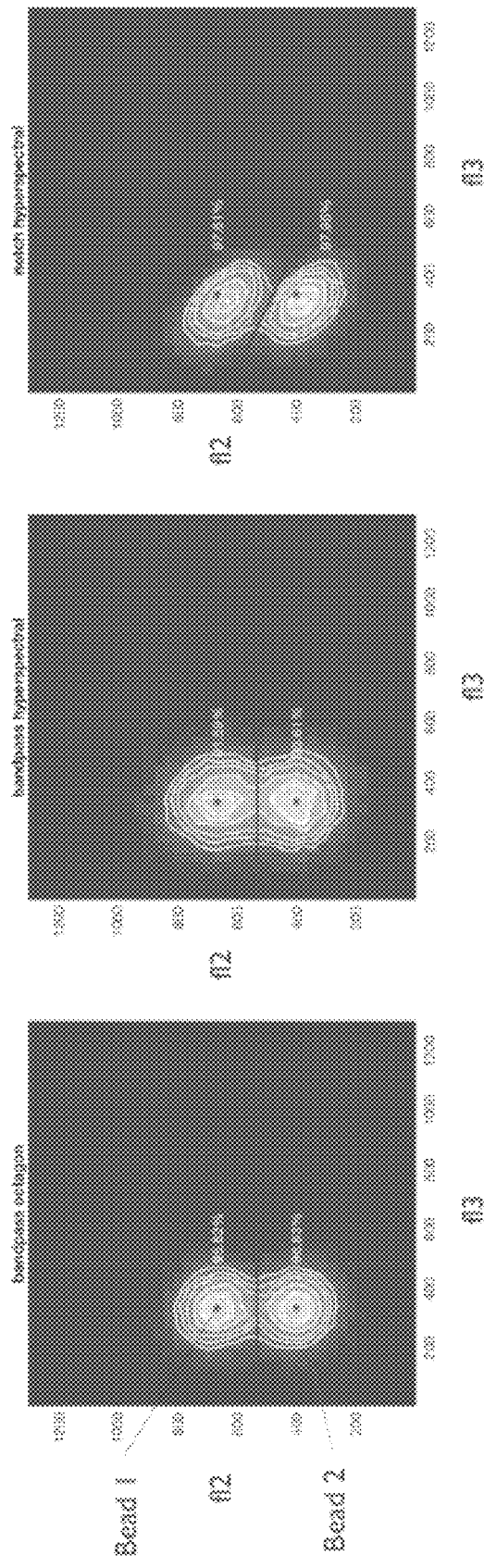
FIG. 5 shows a resulting measurement cloud for three modelled cases, where the two beads emit the same number of photons and are only distinguishable based on their spectral information.

FIG. 5 shows the resulting measurement cloud for the three modelled cases, where the two beads emit the same number of photons and are only distinguishable based on their spectral information. The notch multispectral filter clearly outperforms the bandpass multispectral filter due to its superior photon collection efficiency and performs similarly with the high performance bandpass octagon model.

In the above the inventive concept has mainly been described with reference to a limited number of examples. However, as is readily appreciated by a person skilled in the art, other examples than the ones disclosed above are equally possible within the scope of the inventive concept, as defined by the appended claims.

What is claimed is:

1. A spectral sensor for detection of individual light-emitting particles, said sensor comprising:
    an array of photo-sensitive detectors for detecting light emitted by said individual light-emitting particles;
    a filter array comprising a plurality of different band-stop filters;
    wherein the filter array is configured to transmit wavelengths in a detectable wavelength region to the array of photo-sensitive detectors, and wherein each band-stop filter is associated with one or more particular photo-sensitive detectors, and wherein the plurality of different band-stop filters are configured to reflect different wavelength intervals within said detectable wavelength region so that each photo-sensitive detector of the array is configured to detect the wavelengths of the detectable wavelength region other than a reflected wavelength interval of the band-stop filter being associated with the photo-sensitive detector; and
    a processing unit in communication with said array of photo-sensitive detectors and configured for determining a spectral characteristic of an individual light-emitting particle based on a response from said array of photo-sensitive detectors, wherein determining the spectral characteristic includes determining a fluorophore combination of the individual light-emitting particle based on the response and an inverse function defining expected response of said array of photo-sensitive detectors generated by the filter array and presence of fluorophores bound to the individual light-emitting particle.

2. A spectral sensor according to claim 1, wherein each band-stop filter of the filter array is configured to reflect a wavelength interval in said detectable wavelength region and transmit all other wavelengths in said wavelength interval, wherein at least two band-stop filters of the filter array are configured to reflect wavelength intervals that do not overlap.

3. A spectral sensor according to claim 1, wherein the different reflected wavelength intervals of the plurality of different band-stop filters overlap with less than 50 nm.

4. A spectral sensor according to claim 1, at least one of the photo-sensitive detectors is selected from an avalanche photodiode (APD) and a silicon photomultiplier.

5. A spectral sensor according to claim 1, further comprising at least one additional filter for reflecting light outside said detectable wavelength region arranged in an optical path to said array of photo-sensitive detectors.

6. A spectral sensor according to claim 1, wherein the filter array is integrated on top of the array of photo-sensitive detectors.

7. A spectral sensor according to claim 1, wherein the processing unit is configured to compare the determined spectral characteristic of a light-emitting particle of said individual light-emitting particles with references of known types of light-emitting particles, thereby determining a type of the light-emitting particle.

8. A method for detecting light-emitting particles in a flowing sample comprising:
    a) detecting emitted light from individual light-emitting particles in a flowing sample with a spectral sensor according to claim 1; and
    b) determining a spectral characteristic of individual light-emitting particles by the processing unit, wherein a fluorophore combination of the individual light-emitting particles is determined based on the response from said array of photo-sensitive detectors and an inverse function defining expected response of said array of photo-sensitive detectors generated by the filter array and presence of fluorophores bound to the individual light-emitting particle.

9. A method according to claim 8, further comprising c) identifying a type of light-emitting particle based on the determination of b).

10. A method according to claim 9, wherein the identification of c) comprises comparing the determined spectral characteristic of b) with references of known types of light-emitting particles, thereby identifying a type of light-emitting particle.

11. A method according to claim 8, wherein the light-emitting particles are cells labelled with at least one light-emitting dye.

12. A flow cytometer for analysing a single light-emitting particle of a sample, said flow cytometer comprising:
    an excitation light source for exciting said light-emitting particles;
    a flow cell for receiving and flowing said sample to be analysed through the excitation light of said excitation light source; and a spectral sensor according to claim 1 for detecting the light emitted by single light-emitting particles of said sample upon excitation of said excitation light source.

13. A flow cytometer according to claim 12, further comprising at least one waveguide for transmitting the light emitted by said light-emitting particle to said spectral sensor.

14. A flow cytometer according to claim 12, further comprising a sorting device for sorting said light emitting particles based on information from the spectral sensor.

* * * * *

UNITED STATES PATENT AND TRADEMARK OFFICE
CERTIFICATE OF CORRECTION

| | | |
|---|---|---|
| PATENT NO. | : 11,262,239 B2 | |
| APPLICATION NO. | : 16/715351 | |
| DATED | : March 1, 2022 | |
| INVENTOR(S) | : Peumans et al. | |

It is certified that error appears in the above-identified patent and that said Letters Patent is hereby corrected as shown below:

On the Title Page

Item (30) should read:
Dec. 20 2018 EP 18214403.0

Signed and Sealed this
Seventeenth Day of January, 2023

Katherine Kelly Vidal
*Director of the United States Patent and Trademark Office*